United States Patent [19]
Okland

[11] Patent Number: 5,618,140
[45] Date of Patent: Apr. 8, 1997

[54] TIE DOWN DEVICE

[75] Inventor: Merlyn C. Okland, Story City, Iowa

[73] Assignee: Putco, Inc., Story City, Iowa

[21] Appl. No.: 559,501

[22] Filed: Nov. 15, 1995

Related U.S. Application Data

[62] Division of Ser. No. 187,613, Jan. 27, 1994, Pat. No. 5,476,349.

[51] Int. Cl.⁶ ..................................................... B60P 7/08
[52] U.S. Cl. ........................................... 410/106; 410/101
[58] Field of Search ..................................... 410/101, 106, 410/102, 110, 116; 296/43; 248/499

[56] References Cited

U.S. PATENT DOCUMENTS

| | | | |
|---|---|---|---|
| 3,421,726 | 1/1969 | Getter | 410/110 |
| 3,595,125 | 7/1971 | Jacobs | 410/106 |
| 3,950,010 | 4/1976 | Robertson | 410/110 |
| 4,070,834 | 1/1978 | Jameson | 410/101 X |
| 4,604,013 | 8/1986 | Elwell et al. | 410/110 X |
| 4,634,325 | 1/1987 | Smith-Williams | 410/106 X |
| 4,812,093 | 3/1989 | Millar, Jr. | 410/110 |
| 4,872,719 | 10/1989 | Cardwell | 296/32 X |
| 4,936,724 | 6/1990 | Dutton | 410/110 |
| 4,958,875 | 9/1990 | Zamzow | 296/32 |
| 5,069,377 | 12/1991 | Baughman | 410/101 X |
| 5,139,375 | 8/1992 | Franchuk | 410/110 X |
| 5,141,277 | 8/1992 | Alexander | 410/101 |
| 5,326,203 | 7/1994 | Cockrell | 410/110 |
| 5,431,472 | 7/1995 | Coffland | 410/110 X |
| 5,445,482 | 8/1995 | Davis | 410/101 X |
| 5,476,349 | 12/1995 | Okland | 410/106 |

FOREIGN PATENT DOCUMENTS

| 1729835 | 4/1992 | U.S.S.R. | 296/43 |
|---|---|---|---|

Primary Examiner—Karen B. Merritt
Assistant Examiner—Stephen Gordon
Attorney, Agent, or Firm—Zarley, McKee, Thomte, Voorhees & Sease

[57] ABSTRACT

A tie down device is provided for a vehicle having a carrier sidewall with forward and rear stake holes formed therein. First and second body members each have an anchor end inserted into one of the stake holes and each have a cylindrical end frictionally fitted within the opposite ends of an elongated tube. The body members at the opposite ends of the tube each include a tie opening extending there through for receiving a tie down line for holding cargo in the vehicle carrier.

9 Claims, 2 Drawing Sheets

5,618,140

TIE DOWN DEVICE

This is a divisional of application Ser. No. 08/187,613 filed on Jan. 27, 1994 and issued on Dec. 19, 1995 as U.S. Pat. No. 5,476,349.

BACKGROUND OF THE INVENTION

This invention relates to a tie down device and method for using same. There are many types of vehicles having carrier compartments for carrying various items. Typical of these vehicles are pickup trucks which include an open carrier box at the rear having sidewalls, but having an open top. Many of these vehicles include sidewalls provided with "stake holes" for receiving vertical legs of sideboards which can be mounted to the sidewall for providing an upper extension to the sidewall. These stake holes are usually rectangular in cross section, but may have other cross sectional shapes.

Various types of tie down devices have been provided for permitting ropes or cords to be tied to the tie down devices and to the cargo for holding the cargo stationary during movement of the vehicle. Some vehicles include rails which extend along the upper edges of the sidewalls. These rails often provide unsatisfactory tie down capability because the cords tied to the rails are free to slip longitudinally on the rails.

Therefore a primary object of the present invention is the provision of an improved tie down device and method for using same.

A further object of the present invention is the provision of a tie down device which provides a longitudinal guide rail and which provides means for anchoring tie down lines or cords in such a manner that the cords will not slip longitudinally on the rail.

A further object of the present invention is the provision of an improved tie down device which can be quickly and easily assembled in such a manner that it is securely attached to a vehicle and will not come loose.

A further object of the present invention is the provision of an improved tie down device which includes hand grips which can be gripped by a person climbing into or out of the vehicle carrier.

A further object of the present invention is the provision of an improved tie down device which is comprised of an elongated rail anchored at its opposite ends, and which transfers pulling forces to the two opposite anchored ends.

A further object of the present invention is the provision of an improved tie down device which is attractive in appearance and which does not include any jagged edges or protrusions.

A further object of the present invention is the provision of an improved tie down device and method for using same which is economical to manufacture, durable in use, and efficient in operation.

SUMMARY OF THE INVENTION

The foregoing objects may be achieved by a tie down device for a vehicle having a carrier sidewall, the sidewall having forward and rear ends and having spaced apart forward and rear stake holes. The stake holes each have vertical stake hole axes.

The tie down device includes first and second body members each having an anchor end and a cylindrical end. The anchor ends of the first and second body members are adapted to registered with and anchored to the first and second stake holes respectively, with the cylindrical ends of the first and second body members pointing toward one another and spaced apart a fixed distance. A securing device is provided on each of the anchor ends of the first and second body members for detachably securing the anchor ends to the forward and rear stake holes respectively.

An elongated tube spans the distance between the first and second body members, and has its ends telescopically fitted together with the cylindrical ends of the first and second body members. The first and second body members each have a tie opening extending there through for receiving a tie down line.

DETAILED DESCRIPTION OF THE PREFERRED EMBODIMENT

Figure 1:
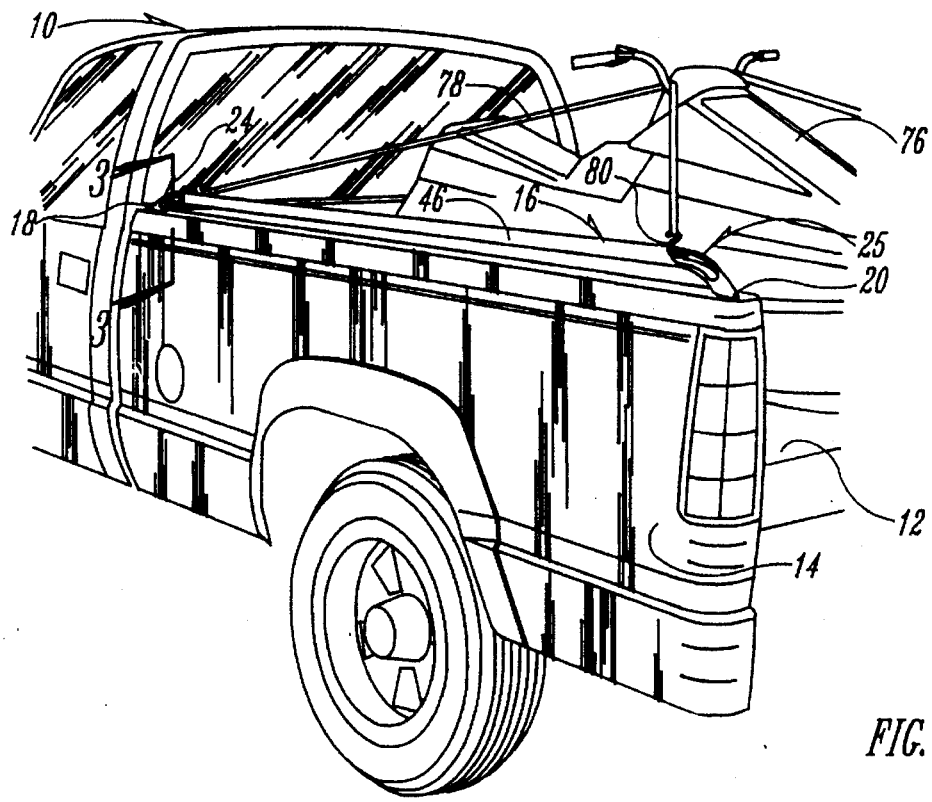
FIG. 1 is a pictorial view of a vehicle having the tie down device of the present invention mounted thereon.

Referring to the drawings the numeral 10 generally designates a pickup truck having a carrier bed 12 and two opposite sidewalls 14 extending upwardly from the carrier bed 12. Mounted to the upper edges of the carrier sidewalls are a pair of rail tie down assemblies 16. The forward end of the rail assembly 16 is mounted in a forward stake hole 18 in the upper edge of sidewall 14 and the rear end of the tie down assembly 16 is anchored in a rear stake hole 20. Each stake hole 18, 20 includes downwardly extending flanges 22 (FIG. 3) extending around the perimeter of the stake hole.

Figure 2:
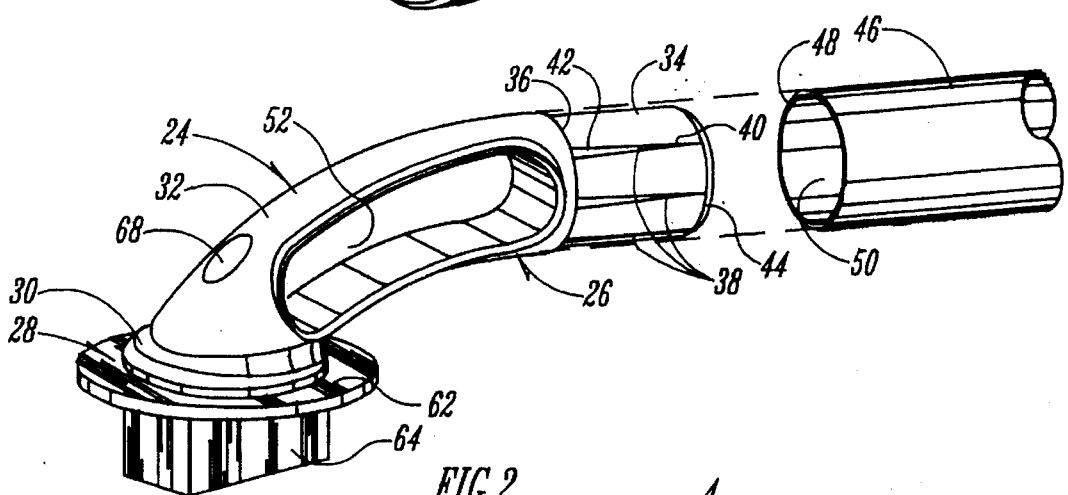
FIG. 2 is an enlarged pictorial exploded view of one end of the tie down device of the present invention.
Figure 4:
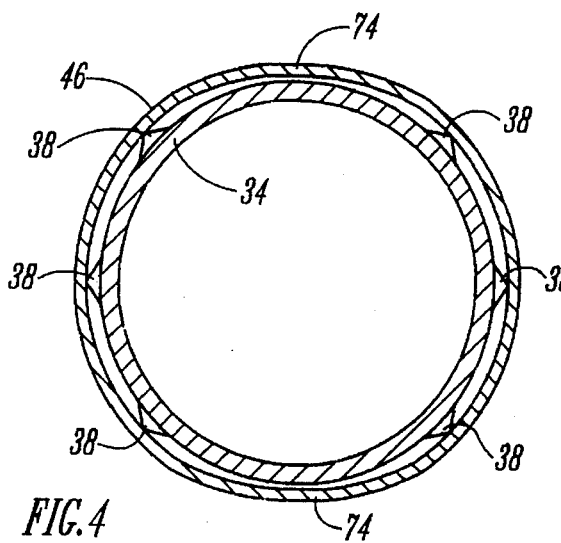
FIG. 4 is an enlarged sectional view taken along line 4—4 of FIG. 3.

The rail tie down assembly 16 includes opposite rail end assemblies 24, 25 which are identical in construction. Referring to FIG. 2 end rail assembly 24 includes a ridged body member 26 having an anchor assembly 28 connected to one end thereof. Ridged body member 26 maybe formed of cast metal and may be plated with chrome or other material to improve its appearance. It is also possible that this part could be molded from plastic or other materials. The ridged body member 26 includes a horizontal flange 30 at one end. Extending upwardly from flange 30 is a curved portion 32. The rigid body member 26 terminates in a horizontal cylindrical portion 34 which is of reduced diameter so as to create an axially presented annular shoulder 36. On the outside surface of the cylindrical portion 34 are a longitudinal extending darts or flutes 38 each of which have a narrowed end 40 adjacent the axial end of cylindrical portion 34 and each of which have a thickened end 42 adjacent shoulder 36. The axial end of the cylindrical portion 34 is provided with a chamfered end 44. Three darts 38 are positioned on each side of the cylindrical portion 34, but no darts are provided on the top and bottom. This permits an elongated tube rail 46 having a tubular end 48 with a hollow bore 50 therein to be fitted tightly over the cylindrical portion 34. While the particular dimensions of the cylindrical member 34 and the tubular member 46 may be varied, it is important that there be a slight clearance between the inner diameter of tube 46 and the outer diameter of cylindrical portion 34. For example the outer diameter of the cylindrical portion 34 can be 1.630 inches and the inner diameter of the tube 46 can be 1.650 inches, leaving a clearance of 0.020 inches therebetween. The flutes or darts 38 at their thickest portions protrude radially outwardly from the outer diameter of the cylindrical portion 34 approximately 0.010 inches. It should be noted however that the darts protrude outwardly only from the sides of the cylindrical portion 34 and do not extend outwardly from the upper and lower portions. This permits the tube 46 to be frictionally fitted over the cylindrical end 34 and to be slightly distorted into an elliptical shape by the flutes 38 as the tube 46 is moved into engagement with the shoulder 36, all as can be seen in FIG. 4. This creates an elliptical or egg shaped distortion at the top and bottom of tube 46 indicated by the numeral 74 in FIG. 4.

A tie opening 52 extends through the curved portion 32 of ridged body member 26. This tie opening is elongated and of sufficient size to provide a hand grip for a person climbing into the carrier bed 12. The opening 52 can also be used to tie ropes, lines, cables, chains or cords to cargo in the carrier bed 12.

Extending vertically down through rigid body member 26 through the center of horizontal flange 30 thereof is a vertical bore 54 having a counter bore 56 at its upper end. A bolt 58 extends downwardly through the vertical bore 54 and includes a bolt head 60 which abuts against the inner end of the counter bore 56. An elliptical rubber washer 62 abuts against the under surface of the circular flange 30 of rigid body member 26. Fitted below the rubber washer 62 is a rubber body 64, and a steel washer 66 is fitted against the bottom surface of the rubber body 64. Bolt 58 extends through the rubber washer 62 and the rubber body member 64, and is threaded through the steel washer 66.

Figure 3:
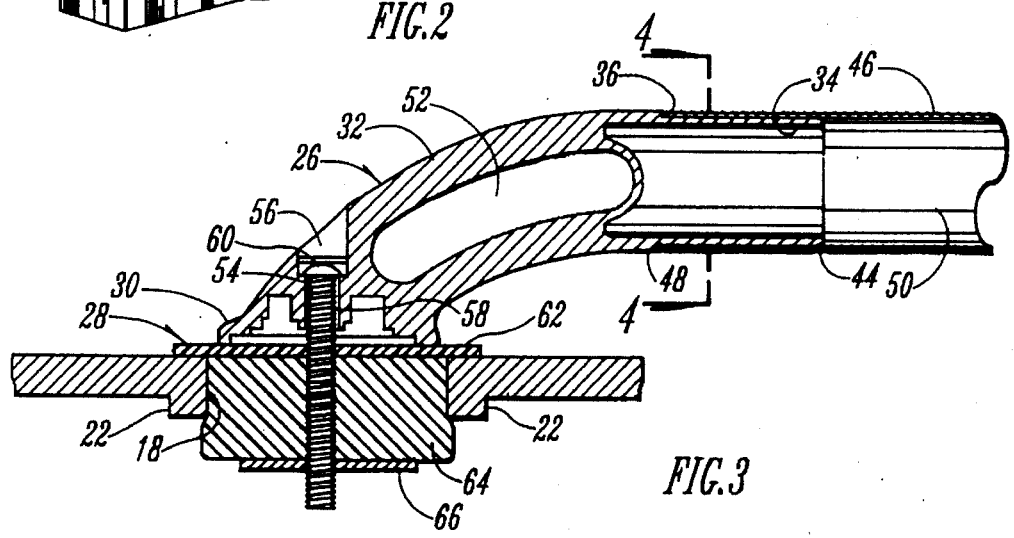
FIG. 3 is a sectional view showing one end of tie down device mounted within a stake hole of the vehicle wall.

The anchoring of the rail end assemblies 24, 25 is shown in FIG. 3. This is accomplished by inserting the rubber body member 64 into the stake hole 18 and by tightening the bolt 58 so as to force steel washer 66 toward the annular flange 30 of the ridged body member 26. This causes the squeezing of the rubber body member 64 so that it bulges outwardly beyond the perimeter of the stake hole 18. This provides securement of the rail end assemblies 24, 25 into the stake holes 18, 20 so that they will be retained in those stake holes and will not pull out. While rubber is used for the washer 62 and the rubber body 64, other elastomeric materials could be used. The primary characteristic necessary for the body member 64 is that it be capable of expanding when squeezed between the washer 66 and the annular flange 30.

Figure 7:
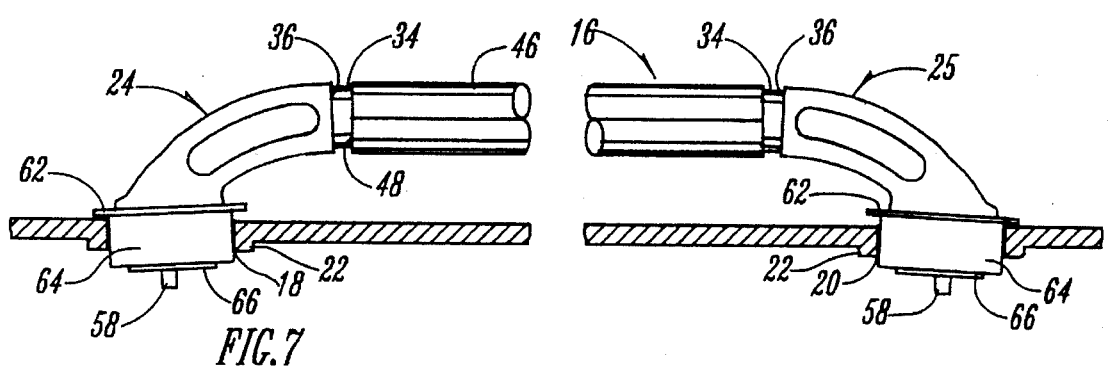
FIG. 7 is a side sectional view of the tie down device of the present invention, showing its configuration and position immediately prior to tightening down of the securing means at the ends of the tie down device.

The method of assembling the device involves the placement of the opposite ends of tube 46 over the cylindrical ends 34 of the two end rail assemblies 24, 25. The ends of the tube 46 are frictionally forced over the ends of the cylindrical portions 34 to the position shown in FIG. 7, leaving a very small space between the ends of tube 46 and the axial shoulders 36. Next the rubber or elastomeric bodies 64 are inserted into the stake holes 18, 20 to the positions shown in FIG. 7. The screws or bolts 58 are then tightened so as to draw the end assemblies 24, 25 tightly down into the stake holes 20 and to secure them in the stake holes 20. When the bolts 58 are tightened for both the end rail assemblies 24, 25, their axial shoulders 36 are drawn slightly together so as to cause the ends of the tube 46 to be forced into abutting engagement with the shoulders 36. This final assembled position is shown in FIG. 3, and it can be seen that the outer surface of the tube 46 and the outer surface of the curved portion 32 of body member 26 provide a smooth continuous surface. Also in this position, the ends of the tube 46 are tightly affixed over the darts 38, and are partially distorted at the distortions 74 so as to ensure a tight fit.

Figure 5:
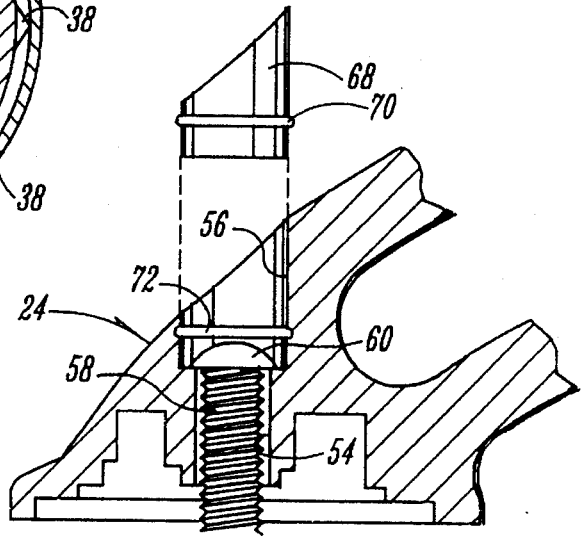
FIG. 5 is a detailed sectional view showing a modified form of the end body member used with the present invention.
Figure 6:
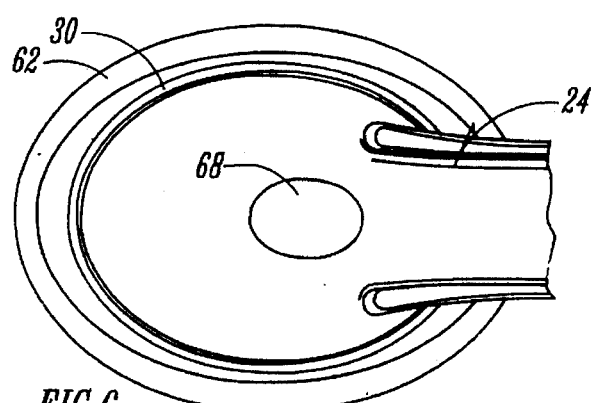
FIG. 6 is a top plan view of the modified form shown in FIG. 5.

Referring to FIGS. 5 and 6 the end rail assemblies 24, 25 can be provided with a plug 68 which is adapted to be retained within the counter bore 56. Plug 68 can be provided with an annular locking ring 70 which is adapted to fit within an annular grove 72 provided on the interior diameter of counter bore 56. As can be seen in FIG. 6, the insertion of the plug 68 provides a smooth continuous outer surface for the end rail assemblies 24, 25.

Once the rail assembly 16 has been fully secured within the forward and rear stake holes 20, it is possible to secure a load 76 within the carrier bed 12 of the vehicle. Tie down cords 78 may be passed through the openings 52 and tied to securely hold the load 76 in place. Alternatively, hooks such as hooks 80 may be hooked through the openings 52 in the end rail assemblies 24, 25.

An important feature of the present invention is the ability of the two end rail assemblies 24, 25 to share in resisting the forces caused by the tendency of the load 76 to move or shift within the carrier bed. Any load applied to end rail assembly 24 is also transferred partially to end rail assembly 25 by virtue of the elongated rail 46. In other words the cord 78 and the rail 46 provide a truss arrangement for transferring forces between the two end rail assemblies 24, 25. Thus the anchoring strength of the rail assembly 16 is substantially greater then would be the case with independent anchors in the two stake holes 18, 20. The large holes 52 also permit a hand grip for climbing into the carrier bed 12. Preferably the rigid body members 26 are made of cast metal which is chrome plated, but they can be made of other materials which can be cast or molded, including various metals and plastics. The elongated tube 46 is preferably made of high grade stainless steel, although other materials may be utilized.

In the example given above for a tube 46 having an inner diameter of 1.650 inches and the cylindrical portions 34 having an outer diameter 1.630 inches, it is important that the axial length of the cylindrical portions 34 be sufficiently great to insure proper attachment of the tube 46 thereto. The preferred axial distance for the cylindrical portions 34 in this example would be 2.13 inches.

From FIGS. 2 and 3 it is apparent that the body member 26 includes a longitudinal axis which commences with a vertical or upstanding axis portion adjacent one end of the body, then extends to a curved axis portion extending through the curved body portion 32, and then terminates in a horizontal axis portion adjacent the other end 34. The tie down opening 52 has a hole axis extending through the body 26 and intersecting with the longitudinal axis of the body between the opposite ends of the body.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A tie down device adapted to be secured within a stake hole having a vertical stake hole axis in a side wall of a vehicle carrier; said tie down device comprising:

an elongated body having opposite first and second ends and a curved body portion extending therebetween, said body having a longitudinal axis which commences with a vertical axis portion adjacent said first end, then extends to a curved axis portion extending through said curved body portion, and then terminates in a horizontal axis portion adjacent said second end;

an anchor connected to said first end of said body and adapted to be detachably secured within said stake hole for securing said first end to said side wall of said vehicle carrier;

a tie down hole having a hole axis extending through said body and intersecting with said longitudinal axis of said body between said first and second ends for receiving a tie down line.

2. A tie down device according to claim 1 wherein said tie down hole extends through said curved body portion of said body.

3. A tie down device according to claim 1 wherein said elongated body is generally circular in cross section.

4. A tie down device according to claim 1 wherein said second end of said elongated body is cylindrical in shape and includes an outer cylindrical surface.

5. A tie down device according to claim 4 wherein said cylindrical surface includes a distal axial end and an inner axial end, at least one tapered flute projecting radially outwardly from said cylindrical surface, said tapered flute having a first end adjacent said distal axial end of said cylindrical surface and extending axially toward said inner axial end of said cylindrical surface, said tapered flute tapering radially outwardly from said first end to said second end thereof.

6. A tie down device according to claim 1 wherein said elongated body is of unitary construction.

7. A tie down device according to claim 6 wherein said elongated body is formed of cast material.

8. A tie down device adapted to be secured within a stake hole in a side wall of a vehicle carrier, said side wall having a longitudinal axis and said stake hole having a vertical axis, said tie down device comprising:

an elongated body having first and second opposite ends and a curved body portion extending therebetween, said body having a longitudinal axis which commences with an upstanding axis portion adjacent said first end and curves approximately 90° through said curved body portion to terminate in a horizontal axis portion adjacent said second end;

an anchor connected to said first end of said body and adapted to be detachably secured within said stake hole for securing said first end to said side wall of said vehicle carrier;

a tie down hole extending through said body between said first and second ends for receiving a tie down line.

9. A tie down device according to claim 8 wherein said tie down hole extends transversely through said body longitudinal axis and through said curved body portion.

* * * * *